Jan. 25, 1927.  E. BRÜNING  1,615,679
AGRICULTURAL MACHINE
Filed Aug. 20, 1926

Witnesses:
Erich Peters.
Cläre Heise.

Inventor:
Ernst Brüning
by
Attorney

Patented Jan. 25, 1927.

1,615,679

UNITED STATES PATENT OFFICE.

ERNST BRÜNING, OF BADINGEN, GERMANY.

AGRICULTURAL MACHINE.

Application filed August 20, 1926, Serial No. 130,481, and in Germany February 20, 1926.

This invention relates to agricultural machines and especially to a machine in which a plow and a harrow are united, and it has for its object to ensure, notwithstanding the mutual movability of the implements necessary for the good working of the ground, such secure connection of said two implements that no special attention is required for the harrow, and any danger from the harrow being flung in lateral directions being avoided.

An embodiment of the invention is illustrated, by way of example, in the accompanying drawing in which:—

Figure 1:
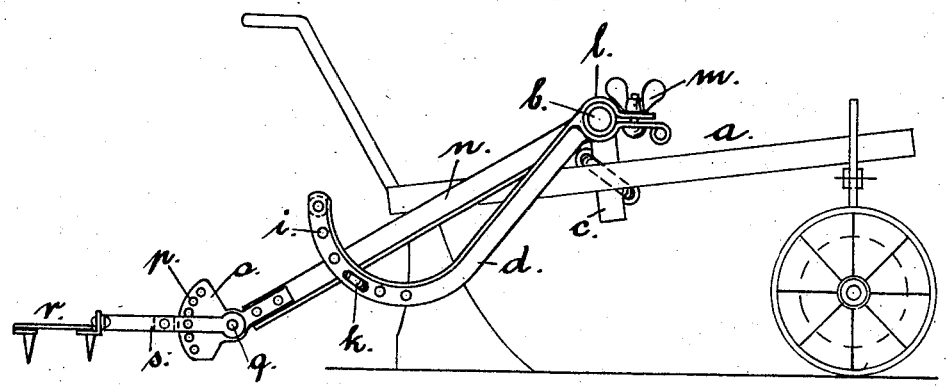
Fig. 1 shows in side elevation a plow and harrow combined.
Figure 2:
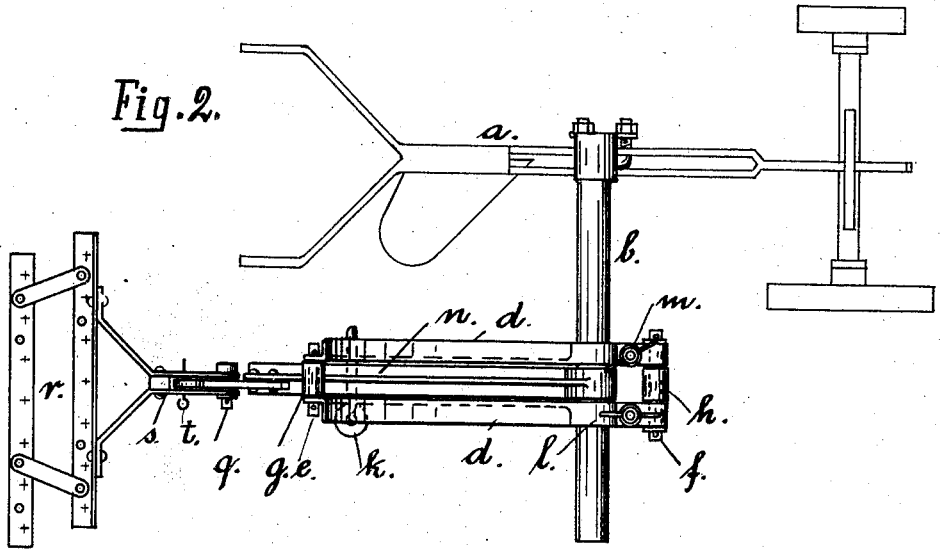
Fig. 2 is a plan view of Fig. 1.

$a$ is the beam of a one-share or two share plow. $b$ is a transverse tube the end $c$ of which is fixed on the plow beam $a$ adjustable in vertical direction. The end $c$ of the transverse tube $b$ is bent downward at an angle to the tube $b$. On the transverse tube $b$ two curved bars $d$ are mounted so that they can be shifted in lateral directions and rotated through any desired angle around the transverse tube $b$. The two bars $d$ are spaced by two tubular spacers $g$ and $h$ and connected with one another by bolts $e$, $f$ located in said tubular spacers. The curved portions of the bars $d$ have holes $i$, designed to receive a cotter $k$. The clip-shaped front end $l$ of each bar $d$ grips around the transverse tube $b$ and is fixed on said tube by screws $m$. A rod $n$ mounted with its eye-shaped end on the transverse tube $b$ is oscillatably enclosed between said two bars $d$ and carries in its rear end a segment $o$ which has holes $p$ arranged on an arc of a circle the centre of said circle having a pivot pin $q$ fixed in said segment.

A small size harrow $r$ has a forwardly projecting double arm $s$ which has holes designed to be brought into register with any of the holes $p$ of the segment $o$. The double arm is pivotally fixed on the segment $o$ by the pivot pin $q$, a cotter $t$ inserted through two opposite holes of the double arm and through one hole $p$ of segment $o$ serving to fix the harrow $r$ on the tubular rod $n$.

The agricultural machine described combines a plow and a harrow, which latter, its position having once been adjusted with regard to the plow, is adapted to swing in vertical directions but not in lateral directions.

It is evident that for certain elements described other equivalent elements might be substituted without exceeding the limits of the present invention.

I claim:—

1. An agricultural machine combined of a plow and of a harrow, comprising in combination with the plow and with the harrow, a plow beam, a transverse tube adjustably fixed at the one end of said plow beam, a rearwardly extending rod oscillatably mounted on said transverse tube, two bars adjustably fixed on said transverse tube at the right and left of said rod and having holes in their curved rear portions, a cotter in the holes of said curved bars to support said rod, and a harrow fixed to the rear end of said rod.

2. An agricultural machine combined of a plow and of a harrow, comprising in combination with the plow and with the harrow, a plow beam, a transverse tube, means for removably fixing one end of said transverse tube on said plow beam, a straight rod having an eye at the front end oscillatably mounted on said transverse tube, two bars having each a curved rear portion with holes and arranged one at the right and the other at the left of said straight rod, a clip at the front end of each bar, tubular spacers the one between the front ends of said curved bars and the other between the rear ends of said curved bars, two transverse bolts one in the front ends and the other in the rear ends of said curved bars and traversing each one of said spacers, a cotter in two opposite holes of the curved portions of said bars and supporting said straight rod, a segment fixed on the rear end of said rod and having holes arranged on an arc of a circle, a pivot pin in said segment and forming the centre of the arc of a circle on which said holes are arranged, a double arm on the front end of said harrow and hingedly fixed on said pivot pin and having a number of holes, and a cotter inserted through two opposite holes of said double arm and through one of the holes of said segment to fix said harrow to said straight rod so that said harrow can move with regard to said plow in vertical directions but not in lateral directions.

In testimony whereof I affix my signature.

ERNST BRÜNING.